United States Patent [19]

Cameron et al.

[11] Patent Number: 5,601,701
[45] Date of Patent: Feb. 11, 1997

[54] PROCESS FOR THE ELIMINATION OF MERCURY FROM HYDROCARBONS BY PASSAGE OVER A PRESULPHURATED CATALYST

[75] Inventors: Charles Cameron, Paris; Jean Cosyns, Maule; Patrick Sarrazin, Rueil Malmaison; Jean Paul Boitiaux, Poissy; Philippe Courty, Houilles, all of France

[73] Assignee: Institut Francais du Petrole, Rueil-Malmaison, France

[21] Appl. No.: 193,590

[22] Filed: Feb. 8, 1994

[30] Foreign Application Priority Data

Feb. 8, 1993 [FR] France .................................. 93 01443

[51] Int. Cl.⁶ .................................................. C10G 45/04
[52] U.S. Cl. .................... 208/251 H; 208/253; 208/293; 208/295; 208/302; 208/303
[58] Field of Search ........................ 208/251 R, 251 H, 208/293, 253, 295, 302, 303

[56] References Cited

U.S. PATENT DOCUMENTS

| 4,338,288 | 7/1982 | Rollman | 423/210 |
| 4,709,118 | 11/1987 | Yan | 208/251 R |
| 4,911,825 | 3/1990 | Roussel et al. | 208/251 R |
| 5,053,209 | 10/1991 | Yan | 208/253 |
| 5,153,163 | 10/1992 | Roumieu et al. | 502/222 |
| 5,202,301 | 4/1993 | McNamara | 208/251 R |
| 5,401,392 | 3/1995 | Courty et al. | 208/253 |

FOREIGN PATENT DOCUMENTS

| 0332526 | 9/1989 | European Pat. Off. . |
| 0357873 | 3/1990 | European Pat. Off. . |
| 0466568 | 1/1992 | European Pat. Off. . |
| WO90/10684 | 9/1990 | WIPO . |

*Primary Examiner*—Helane Myers
*Attorney, Agent, or Firm*—Millen, White, Zelano, & Branigan, P.C.

[57] ABSTRACT

The invention concerns a process for the elimination of mercury from hydrocarbons by passage of the feedstock with hydrogen over a catalyst then bringing the product obtained into contact with a mercury retention bed, the catalyst comprising at least one element selected from the group constituted by iron, nickel, cobalt, molybdenum, tungsten, palladium, wherein at least 5% is in the sulphide state. Any arsenic present in the feedstock is also eliminated.

In accordance with the invention, the catalyst is simultaneously presulphurated and reduced.

The invention results in a considerable reduction in operation period and high retention efficiency at temperatures between 120° C. and 250° C. and in the presence of 0–1000 mg of sulphur/kg of feed.

17 Claims, 1 Drawing Sheet

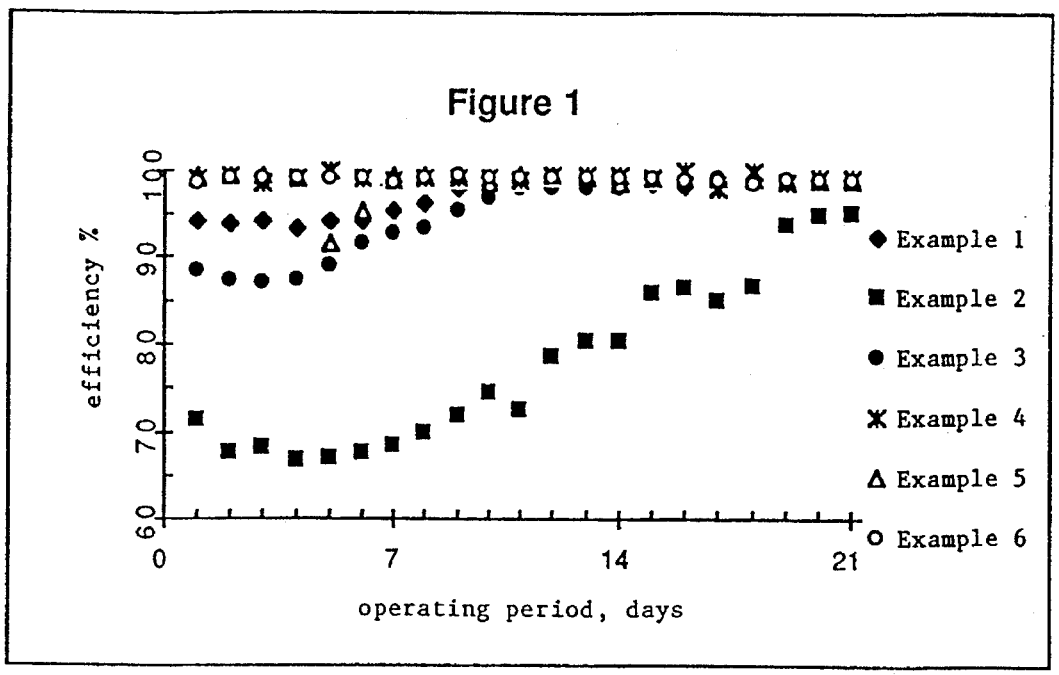

PROCESS FOR THE ELIMINATION OF MERCURY FROM HYDROCARBONS BY PASSAGE OVER A PRESULPHURATED CATALYST

BACKGROUND OF THE INVENTION

The present invention concerns the elimination of mercury and, if present, arsenic from hydrocarbons using a catalyst for transforming mercury containing compounds into elemental mercury and a mercury retention bed, said process resulting in a much higher mercury retention efficiency from the initial startup period of the process.

Liquid condensates (by-products of gas production) and some crude oils are known to contain numerous metallic trace compounds often in the form of organometallic complexes. These metallic compounds very often poison the catalysts used during transformation of these fractions into industrial products.

Purification of these feedstocks for use in transformation processes for condensates or crudes is thus advantageous in order to avoid mercury and possibly arsenic entrainment. Purification of the feedstock upstream of the treatment processes protects the installation assembly.

Some of the assignee's processes perform well as regards mercury removal from liquid hydrocarbons which act as feedstock for various treatment processes. The assignee's U.S. Pat. No. 4,911,825 clearly demonstrates the advantage of mercury retention in a two step process wherein the first step consists in bringing the feedstock in the presence of hydrogen into contact with a catalyst containing at least one metal from the group constituted by nickel, cobalt, iron and palladium. Mercury is not (or is only slightly) retained by the catalyst but it is retained, in a second step, by a bed containing sulphur or a metal sulphide, the metal being copper, iron or silver.

The assignee's patent application WO 90/10 684 describes a process for elimination of mercury from liquid hydrocarbons. This invention concerns catalysts having the ability to resist sulphur poisoning (thioresistance). These novel catalysts allow mercury retention under conditions which are too severe for the catalysts described in the prior art. Thus, this process is particularly useful for purification of difficult feedstocks such as, for example, gas oils from fractionation of crude oil whose sulphur content is frequently between 0.4 and 1.0% by weight.

The process described in U.S. Pat. No. 4,911,825 on the other hand is more effective for feedstocks having a lower sulphur content, for example less than 0.15% by weight.

It has been established, however, that with some feedstocks having a low sulphur content, for example less than 0.07% by weight, the mercury retention efficiency at the beginning of the mercury removal process is lower in the first hundreds of hours; then it rises. It has also been found that the mercury retention efficiency is lower for feedstocks with a very low sulphur content, for example less than 0.02% by weight. In this latter case, it is necessary to increase the operating temperature of the reactor by several dozen degrees and/or increase the hydrogen flowrate to retain sufficient mercury.

SUMMARY OF THE INVENTION

The present invention aims to overcome these drawbacks.

It has been discovered that pretreatment of the catalysts for transformation of mercury containing compounds into elemental mercury by a sulphur containing agent in the presence of a reducing agent results in a considerable reduction in the operating period of the process and in high mercury retention efficiency even when using a feedstock with a very low sulphur content, and at low temperatures (less than or equal to 250° C.).

The object of the present invention is to provide a process for the elimination of mercury and, if present, arsenic wherein the catalyst for transforming mercury containing compounds into elemental mercury is pretreated before being brought into contact with the hydrocarbon feedstock to be purified. According to this process, a mixture of the feedstock and hydrogen is brought into contact with a presulphurated catalyst comprising at least one metal from the group formed by iron, nickel, cobalt, chromium, molybdenum, tungsten and palladium where at least 5% and at most 50% of the metal is in the form of the sulphide, then the product obtained is brought into contact with an elemental mercury retention bed comprising sulphur or a metal sulphide.

The catalyst used in the composition of the present invention is constituted by at least one metal M selected from the group formed by iron, nickel, cobalt, chromium molybdenum, tungsten and palladium and a support. At least 5% and at most 50% of the metal M must be in the form of its sulphide. Preferably, nickel or an association of nickel and palladium is used.

The solid mineral dispersant (support) may be selected from the group formed by alumina, aluminosilicates, silica, zeolites, activated carbon, clays and alumina cements. Preferably, it has a large surface area, sufficient porous volume and an adequate average pore diameter. The BET surface area should be greater than 50 $m^2/g$, preferably between about 100 and 350 $m^2/g$. The support should have a porous volume, measured by nitrogen desorption, of at least 0.5 $cm^3/g$ and preferably between 0.6 and 1.2 $cm^3/g$ and an average pore diameter at least equal to 70 nm, preferably greater than 80 nm (1 nm=$10^{-9}$ m).

Preparation of a solid (or catalyst precursor) containing at least one metal M in metallic form or in the form of a supported metallic oxide is sufficiently known to the skilled person not to necessitate description within the scope of the present invention. The metal M content of the catalyst (calculated for the oxide form) is preferably at least 5% by weight and at most 60% by weight, more advantageously at most 40%, even 30%.

Palladium is a particular case, having at most 0.2% of palladium (calculated for the metal).

The presulphuration process is described in patent EP-A-466 568 (whose teaching is hereby included).

The bed precursor comprising the supported metal(s) in the metallic and/or oxide form is a) in a first step, impregnated with an aqueous or organic solution or an aqueous or organic suspension comprising at least one organic reducing agent, and at least one sulphur containing agent selected from the group constituted by:
  at least one organic polysulphide mixed with elemental sulphur,
  at least one organic disulphide which may if necessary be mixed with elemental sulphur,
  at least one organic or inorganic sulphide which may if necessary be mixed with elemental sulphur,
  elemental sulphur, b) in a second step, the impregnated precursor is thermally treated. The temperature is, for example, between 100°–200° C., generally between 130°–170° C. and more particularly around 150° C. The treatment period is from 30 min to 3 h.

Sulphur addition may be carried out offsite by impregnating the catalyst precursor either with ammonium sulphide and/or a colloidal suspension of sulphur in water, or with a sulphur containing agent, ie, Sulphur and/or one or more sulphur containing compounds, in organic solution. The reducing agent may be, for example, formaldehyde, acetaldehyde, hydrazine, methyl formiate, formic acid, etc. . . .

Before being brought into contact with the feedstock to be treated, the catalyst is, if necessary, reduced by hydrogen or by a hydrogen containing gas at a temperature of 120° C. to 600° C., preferably 140° C. to 400° C.

The presulphurated then reduced solid thus prepared constitutes the catalyst of the present invention in its active form.

The mercury retention bed which follows the catalyst in the inventive process must have low solubility in the feedstock to be treated and a high affinity for elemental mercury. By way of indication, the following mercury retention beds may be mentioned: copper sulphide, tin dichloride and potassium iodate.

The assembly constituted by the catalyst and mercury retention bed may be used either in two reactors or in a single reactor. When using one reactor, the catalyst and the retention bed are located in two separate beds. In both configurations the retention bed is located downstream of the catalyst.

Depending on the quantity of mercury and/or arsenic (calculated for the elemental form) contained in the feedstock, the volume ratio of catalyst to retention bed may vary between 1:10 and 5:1.

When using separate reactors, regarding the catalyst a temperature range of 120° C. to 250° C. may be used, more advantageously 130° C. to 200° C. or even 130°–200° C., preferably 140°–190° C. and most preferably 140° C. to 190° C. Operating pressures are preferably 1 to 40 bars and more advantageously 5 to 35 bars.

In order to ensure high mercury retention efficiency, it is preferable for the mercury retention bed to operate below 220° C., preferably below 180° C. and more preferably below 150° C. The volume flow calculated with respect to the retention bed may be 1 to 50 $h^{-1}$ and more particularly 1 to 30 $h^{-1}$ (volume of liquid per volume of bed per hour).

The hydrogen flowrate with respect to the catalyst is, for example, between 1 and 500 volumes (gas under normal conditions) per volume of catalyst per hour.

Gaseous or liquid feedstocks to which the invention is particularly applicable are those comprising $10^{-3}$ to 5 milligrams of mercury per kilogram of feedstock (mg/kg or ppm) and possibly 0 to 1000 milligrams of sulphur per kilogram of feedstock. They may also contain arsenic, generally 0 to 5 mg/kg of feedstock.

The following examples are given by way of example and illustrate the invention without in any way limiting its scope.

EXAMPLES

Catalyst A: Fifteen kilograms of a macroporous alumina support in the form of spheres of 1.5–3 mm diameter having a specific surface area of 160 $m^2/g$, a total pore volume of 1.05 $cm^3/g$ and a macroporous volume (diameter >0.1 μm) of 0.4 $cm^3/g$ were impregnated with 20% by weight of nickel in the form of an aqueous nitrate solution. Following drying at 120° C. for 5 h and thermal activation at 450° C. for 2 h in a current of air, spheres containing 25.4% by weight of nickel oxide were obtained.

Catalyst B: Five kilograms of catalyst A were dry impregnated with a solution comprising 175 g of DEODS, diethanoldisulphide, (74 g of sulphur) in 5150 $cm^3$ of a solution of 15% methyl formiate in white spirit. The catalyst thus prepared was activated at 150° C. for 1 h.

Retention bed: Fifteen kilograms of support used for preparation of catalyst A were impregnated by 10% by weight of copper in the form of an aqueous solution of copper nitrate trihydrate. After drying at 120° C. for 5 h and thermal activation at 450° C. for 2 h in a current of air, spheres containing 12.5% by weight of copper oxide were obtained. These spheres were then impregnated with a 10% solution of ammonium sulphide. The product was activated at 120° C. over 2 h in a current of nitrogen. This bed was used in reactor II in all the following examples.

The tests were carried out using two reactors in series: reactor I held the catalyst (50 $cm^3$) and reactor II, following reactor I, held the retention bed (50 $cm^3$). The catalyst was operated at 180° C. in all the following examples and the mercury retention bed at 20° C. An upward feed was used in both reactors.

Example 1 (Comparative)

Catalyst A was reduced at 400° C. in hydrogen at a flowrate of 20 l/h and pressure of 2 bars for 4 h. The reactor was then cooled to the reaction temperature of 180° C. A heavy condensate from liquid gas was then passed with hydrogen through the catalyst then through the retention bed. The feedstock flowrate was 400 $cm^3/h$ and that of the hydrogen, 3.5 l/h. The test was carried out at a pressure of 35 bars.

The condensate used in this test (condensate A) had the following characteristics:

initial boiling point: 21° C.

final boiling point: 470° C.

mercury content: 1680 μg/kg ( 1.68 ppm )

sulphur content: 237 mg/kg arsenic content 65 μg/kg

The test was carried out over a period of 20.5 days. An effluent sample was recovered from the process and analysed every day. The retention results expressed in per cent efficiency are shown in FIG. 1. It can be seen that the retention efficiency is high, however during the first two hundred hours of operation, the retention efficiency is slightly lower than at the end of the test. A small amount of arsenic (5 to 10 μg/kg) was detected during the first 72 hours.

Example 2 (Comparative)

A second mercury retention test was carried out using a condensate (condensate B) having the following characteristics:

initial boiling point: 18° C.

final boiling point: 520° C.

mercury content: 120 μg/kg sulphur content: 89 mg/kg arsenic content: <5 μg/kg

Prereduction and operating conditions were identical to those of the test of example 1. FIG. 1 shows that the mercury retention efficiency during this test was substantially lower than that of the preceding test.

Example 3 (Comparative)

A third mercury retention test was carried out using a condensate (condensate C) having the following characteristics:

initial boiling point: 21° C.
final boiling point: 491° C.
mercury content: 2210 µg/kg
sulphur content: 117 mg/kg
arsenic content: 80 µg/kg Again, all the prereduction and operating conditions were identical to those of the test of example 1. The test results, shown in FIG. 1, were intermediate with respect to those of examples 1 and 2. As in example 1, small amounts of arsenic (5 to 10 µg/kg) were detected during the first 240 hours of operation.

Example 4 (In Accordance with the Invention)

The first reactor was loaded with 50 cm³ of catalyst B, presulphurated as described above. All other test conditions were identical to those indicated in example 1 including the feedstock (condensate A). The results obtained in the presence of catalyst B show an increased retention efficiency from the beginning of the test and that the efficiency was maintained over the whole test period. The arsenic content remained below the detection level (<µg/kg) during the entire test.

Example 5 (In Accordance with the Invention)

As in example 4, the first reactor was loaded with 50 cm³ of catalyst B. In this case, the catalyst was reduced at 300° C. under hydrogen at a flowrate of 20 l/h at a pressure of 2 bars for 6 h before cooling to the reaction temperature of 180° C. Condensate B was used as the feedstock for purification. The other operating conditions were the same as those of example 1. The test results clearly show a substantial increase in the performance of the mercury retention bed in accordance with the invention.

Example 6 (In Accordance with the Invention)

This test was conducted in identical manner to that of example 5 but using condensate C as the feedstock to be purified. The test results are as good as those obtained in example 5. It should also be noted that the arsenic content of the effluent was below the detection limit throughout the test.

BRIEF DESCRIPTION OF THE DRAWING

The test results (mercury retention as a function of time) are shown in FIG. 1.

It should further be noted that the results of examples 4, 5 and 6 are almost always superimposable: the results of examples 1 and 3–6 were very close after the tenth day of operation.

We claim:

1. In a process for the elimination of mercury from a hydrocarbon feedstock comprising mercury compounds and from 0 to 1000 mg of sulphur/kg, wherein the feedstock, in the presence of hydrogen, is brought in a first step into contact with a catalyst consisting essentially of at least one metal component and a support, the resultant treated feedstock then being brought in a second step into contact with a mercury retention bed comprising sulphur or a metallic sulphide, the improvement wherein the metal component of the catalyst consists essentially of at least one presulfurized metal selected from the group consisting of iron, nickel, cobalt, molybdenum, tungsten, chromium and palladium, at least 5% and at most 50% by weight of said metal or metals being in the form of its sulphide, and wherein said catalyst is obtained in a first step by impregnation of a catalyst precursor comprising said supported metal or metals in the metallic and/or oxide form, using an aqueous or organic solution or an aqueous or organic suspension comprising a reducing agent and at least one sulphur containing agent selected from the group consisting of (a) at least one organic polysulphide mixed with elemental sulphur,
   (b) at least one organic disulphide optionally mixed with elemental sulphur,
   (c) at least one organic or inorganic sulphide optionally mixed with elemental sulphur, and
   (d) elemental sulphur, said impregnated precursor then being thermally treated in a second step, and wherein the contact with the catalyst takes place at a temperature of 120° C. to 250° C. and a pressure of 1 to 40 bars, and that the contact with the retention bed takes place at a temperature of less than 220° C. and at a volumetric flow of 1 to 50 $h^{-1}$.

2. A process according to claim 1, wherein the hydrogen flowrate with respect to the catalyst is between 1 and 500 volumes of gas per volume of catalyst per hour.

3. A process according to claim 1 wherein the feedstock comprises $10^{-3}$ to 5 mg of mercury per kilogram of feedstock.

4. A process according to claim 1, wherein the volumetric ratio of the catalyst to the retention bed is between 1:10 and 5:1.

5. A process according to claim 1, wherein the catalyst comprises metallic nickel.

6. A process according to claim 1, wherein the catalyst comprises metallic nickel and palladium.

7. A process according to claim 1, wherein the support is selected from the group consisting of alumina, aluminosilicates, silica, zeolites, activated carbon, clays and alumina cements.

8. A process according to claim 1, the impregnation of the catalytic precursor is conducted using at least one sulphur containing liquid selected from the group consisting of ammonium sulphide, a colloidal suspension of sulphur in water, an organic solution of sulphur, and an organic solution of a sulphur containing compound or compounds.

9. A process according to claim 1, wherein the feedstock comprises from 0 to 5 mg of arsenic per kilogram of feedstock.

10. A process according to claim 1, wherein the feedstock is brought into contact with a catalyst at a temperature of 130°–200° C.

11. A process according to claim 1, wherein the catalyst precursor is reduced in hydrogen at 120°–600° C. before being brought into contact with the feedstock.

12. A process according to claim 1, wherein the catalyst precursor is thermally treated at a temperature of between 100° C. and 200° C. in the second step.

13. A process according to claim 7, the support having a BET surface area greater than 50 m²/g, a pore volume measured by nitrogen desorption of at least 0.5 cm³/g, and an average pore diameter at least equal to 70 nm.

14. A process according to claim 8, wherein the impregnation is conducted offsite.

15. A process according to claim 1, wherein the catalyst is nickel oxide, sulfurized with a solution comprising diethanoldisulfide and methyl formate.

16. A process according to claim 15, wherein the retention bed comprises copper sulfide.

17. In a process for the elimination of mercury from a hydrocarbon feedstock comprising mercury compounds and from 0 to 1000 mg of sulfur/kg, wherein the feedstock, in the presence of hydrogen, is brought in a first step into contact with a catalyst consisting essentially of at least one metal component and a support, the resultant treated feedstock then being brought in a second step into contact with a mercury retention bed comprising sulfur or a metallic sulfide, the improvement wherein the metal component of the catalyst consists essentially of at least one presulfurized metal selected from the group consisting of iron, nickel, cobalt, molybdenum, tungsten, chromium and palladium, at least 5% and at most 50% by weight of said metal or metals being in the form of its sulfide.

* * * * *